United States Patent
Bries et al.

[11] Patent Number: 6,001,471
[45] Date of Patent: Dec. 14, 1999

[54] REMOVABLE ADHESIVE TAPE WITH CONTROLLED SEQUENTIAL RELEASE

[75] Inventors: James L. Bries, Cottage Grove, Minn.; Michael D. Hamerski, Baldwin Township, Wis.

[73] Assignee: 3M Innovative Properties Company, St. Paul, Minn.

[21] Appl. No.: 08/940,555

[22] Filed: Sep. 30, 1997

Related U.S. Application Data

[63] Continuation of application No. 08/642,718, May 3, 1996, abandoned
[60] Provisional application No. 60/002,171, Aug. 11, 1995.

[51] Int. Cl.$^6$ .................................. B32B 7/12; C09J 7/02
[52] U.S. Cl. ................... 428/343; 428/40.1; 428/317.3; 428/354; 427/208; 248/205.3; 248/467
[58] Field of Search ................ 428/40.1, 317.3, 428/343, 354; 427/208; 248/205.3, 467

[56] References Cited

U.S. PATENT DOCUMENTS

| | | | |
|---|---|---|---|
| 4,024,312 | 5/1977 | Korpman | 428/343 |
| 4,699,842 | 10/1987 | Jorgensen et al. | 428/343 |
| 4,704,315 | 11/1987 | McClintock | 427/208 X |
| 5,348,793 | 9/1994 | Stettner | 428/343 X |
| 5,409,189 | 4/1995 | Lühmann | 248/205.3 |
| 5,507,464 | 4/1996 | Hamerski et al. | 248/683 |
| 5,516,581 | 5/1996 | Krechkel et al. | 428/317.3 |
| 5,626,931 | 5/1997 | Luhmann | 428/40.1 |
| 5,725,923 | 3/1998 | Lühmann . | |

FOREIGN PATENT DOCUMENTS

| | | |
|---|---|---|
| 43 39 604 | 5/1995 | Germany . |
| WO 92/1133 | 7/1992 | WIPO . |

*Primary Examiner*—Daniel Zirker
*Attorney, Agent, or Firm*—David B. Patchett

[57] ABSTRACT

Double-sided stretchable adhesive tapes are described for use in conventional applications, particularly including the mounting or joining of an object to another surface. An improvement lies within the ability to control the timing of the debonding of both surfaces so that one adhesive surface releases before the other. The earlier release can be either on the object side or the surface side, depending on the desired effect. The present invention is applicable to all stretchable tape constructions including the use of plastic backing materials and/or elastic backing materials and allows such an object to be removed without risking substantial snap-back of the adhesive tape or catapulting of the object. The aforementioned advantages can be achieved by a double-sided adhesive tape having a stretchable backing layer, plastic or elastic, and having a lower-adhesion or non-adhesive portion of one adhesive surface, so that a corresponding greater adhesion adhesive portion of the other side remains more aggressively adhered to a surface during stretch removal while the portion of the one adhesive surface is less aggressively adhered or completely released from its surface. A non-adhesive portion may be adhesive-free, or may be an adhesive layer portion which is rendered non-adhesive. A lower-adhesion portion may comprise a low adhesion material, i.e., a weaker adhesive, or may be rendered lower in adhesion by a treatment or coating.

22 Claims, 4 Drawing Sheets

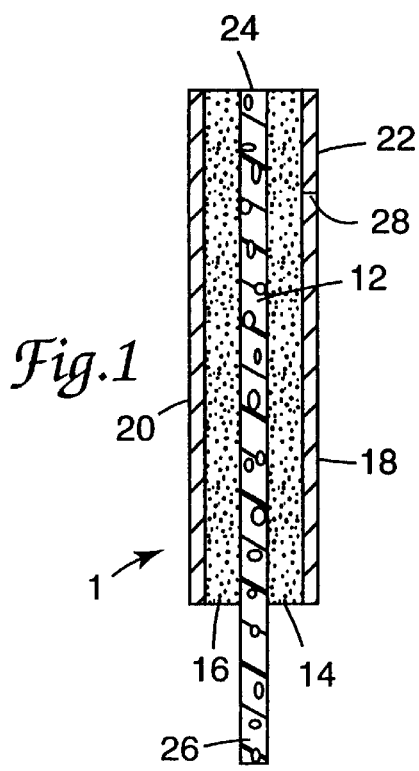
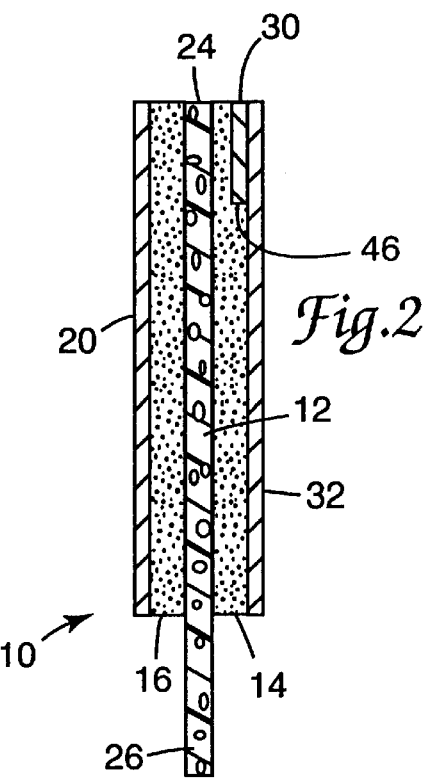
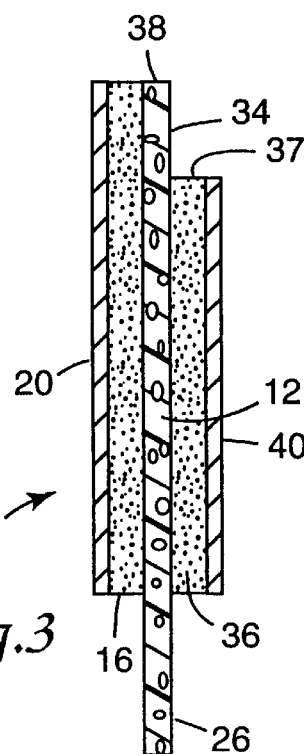
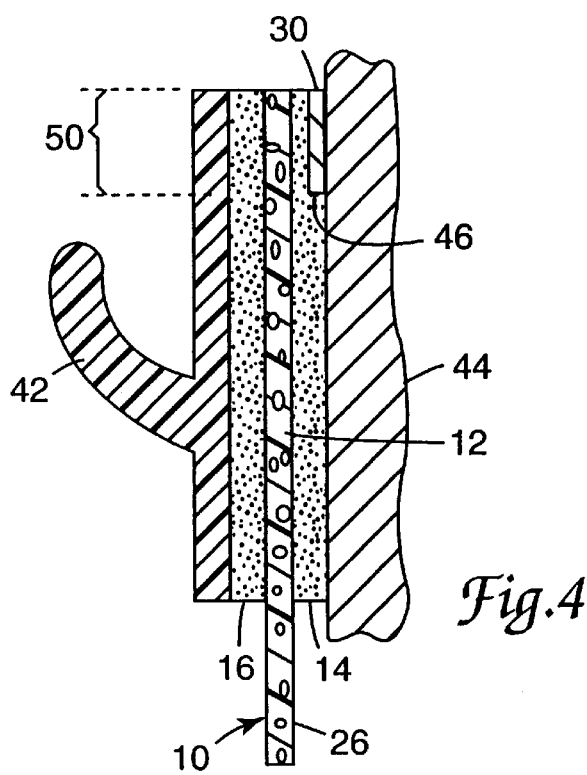

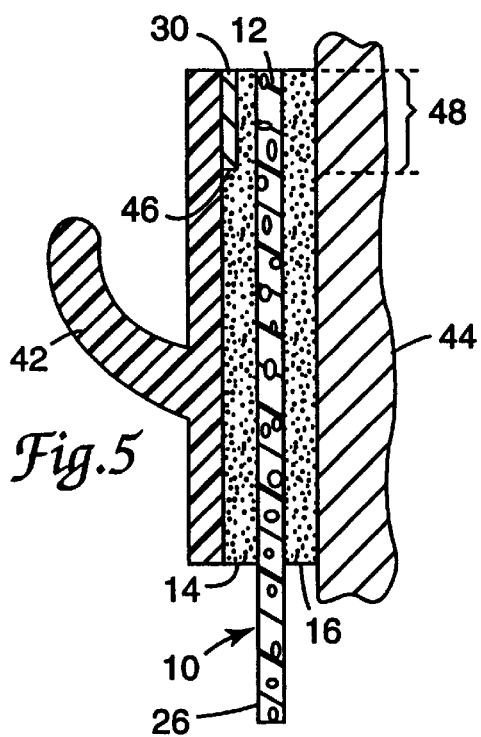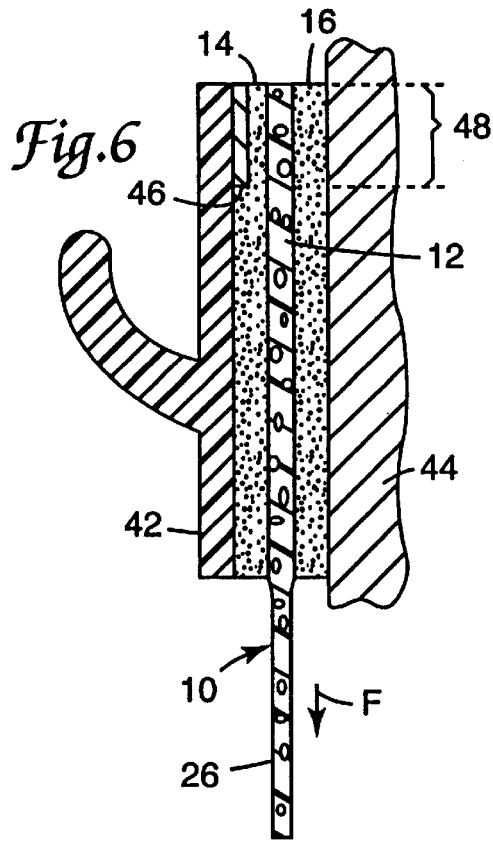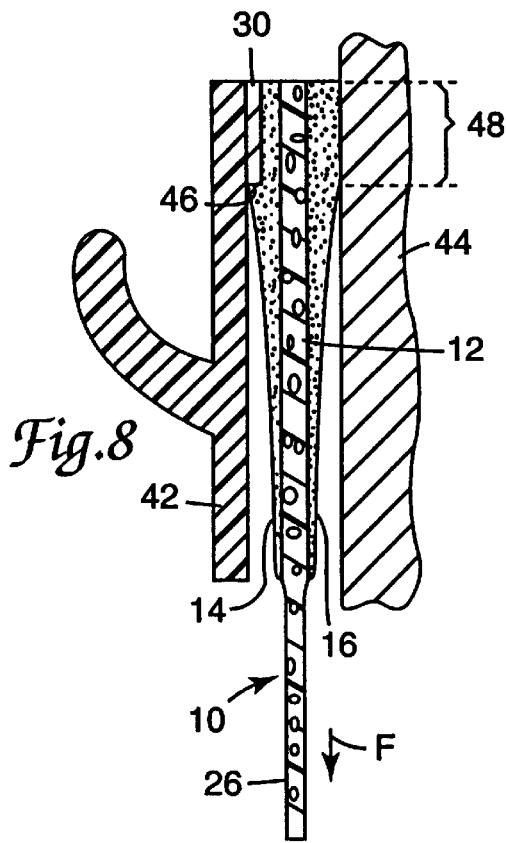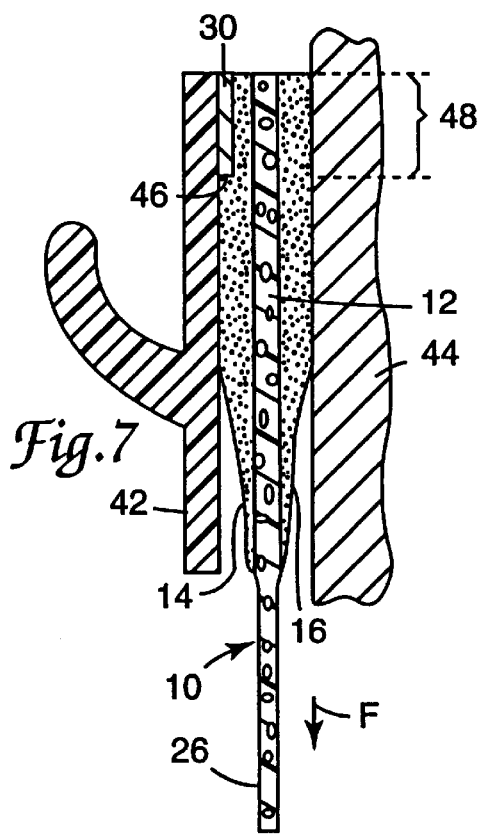

REMOVABLE ADHESIVE TAPE WITH CONTROLLED SEQUENTIAL RELEASE

CROSS-REFERENCE TO RELATED APPLICATION

This is a continuation of application Ser. No. 08/642,718 filed May 3, 1996, now abandoned.

This application claims priority to U.S. Provisional Patent Application No. 60/002,171, filed Aug. 11, 1995.

TECHNICAL FIELD

The present invention relates to adhesive tapes which can be adhered to a surface and thereafter removed without substantially damaging the surface or leaving substantial adhesive residue. More particularly, the present invention includes a controlled sequential release of adhesive surfaces of a double-sided stretchable adhesive tape product.

BACKGROUND OF THE INVENTION

Adhesive products have been designed which are created specifically to enhance their ability to be removed from a substrate after being adhered to such substrate without substantially damaging the substrate surface or leaving substantial adhesive residue thereon. Products include items such as paper notes having a layer of easily removable adhesive adhered to one surface, such as the Post-it™ Note products available from Minnesota Mining and Manufacturing Company of Saint Paul, Minn. It is also known to provide double-sided adhesive products including similar easily-removable adhesive.

Another type of product which has been recently developed is a single-sided or double-sided adhesive tape having conventional pressure-sensitive adhesive on one or both major surfaces thereof, and which includes a tape backing comprising a highly extensible material. See for example European Patent Application 92.903259.7.

These tapes operate in that when the backing is stretched after the tape is adhered on one side or both sides, the adhesive stretches and undergoes clean interfacial debonding from the substrate or substrates to which it is adhered. Such removal typically progresses from one end of the tape to the other as the tape backing is stretched at an angle preferably no greater than about 35° from the surface of the substrate. That is, as the tape is stretched from one end, it debonds from the end being stretched toward its distal end.

The adhesive tapes described in the aforementioned European Patent Application 92.903259.7 include plastic backings. That means, as the backing is stretched, it is permanently deformed and has relatively low elastic recovery. Tapes described include single-sided tapes, double-sided tapes, and tapes comprising film layers, foam layers, and laminates of films and/or foams. In double-sided adhesive tape constructions, both adhesive surfaces debond at the same time and progress substantially at the same rate from the stretched end toward the distal end as the tape backing is stretched.

Co-pending U.S. patent application Ser. No. 08/308,937, which is commonly owned by the Assignee of the present invention, discloses a number of stretchable release tapes comprising constructions of films, foams, and laminates of films and/or foams. Again, such tapes include conventional pressure-sensitive adhesives.

Another type of stretchable release adhesive tape is described in U.S. Pat. No. 5,409,189 to Lühmann, wherein the adhesive tape backings utilized comprise elastic materials. Elastic, as opposed to plastic materials described above, means materials that are stretchable without substantial plastic deformation and which have high elastic recovery after stretching and release. Like the plastic tapes described above, elastic tapes can be single-sided or double-sided and the stretching of the backing causes adhesive stretching and subsequent debonding of the adhesive surface or surfaces from the stretched end to the distal end as the tape is stretched.

Double-sided adhesive tapes are particularly useful in joining and mounting applications. Stretchable release double-sided tapes provide secure bonding to both surfaces with clean removal from both surfaces without substantial damage or adhesive residue. A problem is that such double-sided adhesive tapes simultaneously debond from both adhered sides as the tape is stretched for removal. In applications where these tapes are used to adhere an object to a wall or other surface, the release from both the object and the other surface at the same time may cause the adhesive tape to snap back in the direction of the stretching, similar to the snapping effect of a stretched rubber band, or may cause the object to be catapulted, particularly if the object is not held while being removed. This snap-back of the tape occurs at the point of adhesive release when the resisting force of adhesion to the wall suddenly drops to zero, This effect is exacerbated by the elasticity or recovery properties of the tape.

The above described stretchable tapes are known to be applicable for many applications including the mounting of objects, such as hooks or other hanging devices, to walls, etc.; joining or assembly applications; cushioning or sound-deadening applications; closure applications, such as container closures, e.g. closures for boxes, food and beverage containers; and removable labels.

SUMMARY OF THE INVENTION

The present invention provides an improvement to double-sided stretchable adhesive tapes for use in conventional applications, particularly including the mounting or joining of an object to another surface. The improvement lies within the ability to control the timing of the debonding of both surfaces so that one adhesive surface releases before the other. In this way, the aforementioned problems can be minimized.

The earlier release can be either on the object side or the surface side, depending on the desired effect. Moreover, the present invention is applicable to all stretchable tape constructions, including the use of plastic backing materials and/or elastic backing materials. In any case, the improvement allows such an object to be removed without risking substantial snap-back of the adhesive tape or catapulting of the object. Tape constructions according to the present invention are those in which side-to-side debonding of the tape is sequential, i.e., one side of the tape completes debonding prior to the debonding of the opposite side of the tape.

The aforementioned advantages can be achieved by a double-sided adhesive tape comprising a solid adhesive, or having a stretchable backing layer, plastic or elastic, and having a lower-adhesion or non-adhesive portion of one adhesive surface, so that a corresponding greater adhesion adhesive portion of the other side remains more aggressively adhered to a surface during stretch removal while the portion of the one adhesive surface is less aggressively adhered or completely released from its surface. A non-adhesive portion may be adhesive-free, or may be an adhesive layer portion which is rendered non-adhesive. A lower-adhesion portion may comprise a low adhesion material, i.e., a weaker adhesive, or may be rendered lower in adhesion by a treatment or coating. More particularly, a release strip is preferably used to deaden the adhesive on the one side which is to be positioned adjacent the effective end of the object or the end of the surface to which the adhesive tape is to be applied. With the use of such a release strip, the one side completely debonds from its adhered surface prior to the complete debonding of the other side. The non-adhesive portion of one adhesive surface can be rendered non-adhesive, as noted above, by providing such a release strip, or such portion may simply be adhesive-free. Alternatives useable for release strips include films, papers, powders, foams, inks, other coatings or treatments, and the like, which can be used to render an adhesive layer non-adhesive.

Thus, according to the present invention there is provided a tape adapted for attaching first and second structures to each other. The tape has first and second opposite ends spaced in a first direction, opposite first and second primary outer surfaces extending between those ends, a manually engageable tab portion adjacent its first end, and an attachment portion between its manually engageable portion and its second end. The attachment portion comprises a layer of aggressive pressure sensitive adhesive providing an adhesively aggressive portion of each of the outer surfaces. Each adhesively aggressive portion has a primary end adjacent the first end of the tape, a secondary end adjacent the second end of the tape and is adapted to be firmly adhered to a different one of the structures between its primary and secondary ends. The attachment portion is stretchable so that the attachment portion when between and adhered to the structures can be progressively stretched along its length by the manual application of force to the manually engageable portion to cause separation of the adhesively aggressive surface portions from the structures progressively from their primary ends towards their secondary ends. The secondary ends of the adhesively aggressive surface portions are spaced from each other in the first direction to cause separation of one of the adhesively aggressive surface portions from one of the structures prior to separation of the other of the adhesively aggressive surface portions from the other of the structures.

The tape can comprise a single layer of pressure sensitive adhesive providing both of the adhesively aggressive portions of the outer surfaces and including a masking layer of material having either no adhesive properties or adhesive properties that are significantly reduced from the layer of pressure sensitive adhesive adjacent the second end of the tape and extending over a part of the layer of pressure sensitive adhesive defining one of the adhesively aggressive portions of the outer surfaces to space the secondary ends of the adhesively aggressive portions of the outer surfaces from each other. That material in the masking layer can, for example, be release liner material, repositionable pressure sensitive adhesive, polymeric film, or low adhesion backsize material.

Preferably, the tape includes a stretchable polymeric backing layer having a layer of aggressive pressure sensitive adhesive along each of its opposite major surfaces defining one of its adhesively aggressive portions of its outer surfaces. That polymeric backing layer can, for example, be of polymeric film, polymeric foam, polymeric film laminated to polymeric foam, or two layers of polymeric film laminated on opposite sides of a layer of polymeric foam.

With such a backing, the ends adjacent the tape's second end of the layers of aggressive pressure sensitive adhesive on both major surfaces of the backing layer can extend to the same location with respect to the second end of the tape, and the tape can include a masking layer of material having either no adhesive properties or adhesive properties that are significantly reduced from the layer of pressure sensitive adhesive adjacent the second end of the tape and extending over a part of one of the layers of aggressive adhesive to space the secondary ends of the adhesively aggressive portions of the outer surfaces from each other.

Alternatively, ends adjacent the tape's second end of the layers of aggressive adhesive on both major surfaces of the backing layer can define the secondary ends of the adhesively aggressive portions of the outer surfaces and can extend to different locations with respect to the second end of the tape to space the secondary ends of the adhesively aggressive portions of the outer surfaces from each other.

Alternatively, an assembly that causes one adhesive surface to release before the other can comprise a tape attaching first and second structures to each other in which the first structure has a rear surface portion adapted to be adhered to that extends to an edge at which the rear surface ends or past which the rear surface can not be adhered to (i.e., because of surface treatments such as release material or surface texture). The tape has first and second opposite ends spaced in a first direction, opposite first and second primary outer surfaces extending between its ends, a manually engageable tab portion adjacent its first end, and an attachment portion between its manually engageable portion and its second end. The attachment portion comprises a layer of aggressive pressure sensitive adhesive providing an adhesively aggressive portion of each of the outer surfaces, each adhesively aggressive portion having a primary end adjacent the first end of the tape, a secondary end adjacent the second end of the tape and being firmly adhered to a different one of the structures. The adhesively aggressive portion adhered to the first structure is adhered to its rear surface with the edge spaced in the first direction from the primary end of the adhesively aggressive portion adhered to the second structure and with the adhesively aggressive portion adhered to the second structure at its secondary end. The attachment portion is stretchable so that the attachment portion between and adhered to the structures can be progressively stretched along its length by the manual application of force to the manually engageable portion to cause separation of the adhesively aggressive surface portions from the structures progressively from their primary ends towards their secondary ends. The spacing between the edge and the secondary end of the adhesively aggressive surface portion adhered to the second structure cause separation of the adhesively aggressive surface portion from the first structure prior to separation of the other of the adhesively aggressive surface portions from the second structure.

BRIEF DESCRIPTION OF THE DRAWINGS

FIG. 1 is an enlarged side view in cross-section of a first embodiment of an adhesive tape construction in accordance with the present invention;

FIG. 2 is an enlarged side view in cross-section of an alternate construction of the adhesive tape of FIG. 1;

FIG. 3 is an enlarged side view in cross-section of yet another alternative construction of the adhesive tape of FIG. 1;

FIG. 4 is an enlarged side view in cross-section of the adhesive tape construction of FIG. 2 shown adhered between a substrate and a mounted object;

FIG. 5 is an enlarged side view in cross-section of the adhesive tape construction of FIG. 2 shown between a substrate and a mounted object like FIG. 4, but with a release strip included in the tape construction positioned against the mounted object rather than against the substrate;

FIG. 6 is an enlarged side view in cross-section of the adhesive tape construction, substrate, and mounted object as shown in FIG. 5, but with a backing layer in the tape construction partially stretched and just prior to any debonding of adhesive layers included in the tape construction;

FIG. 7 is an enlarged side view in cross-section similar to FIG. 6, but with the backing layer further stretched and with both adhesive layers partially debonded from the substrate and mounted object;

FIG. 8 is an enlarged side view in cross-section showing a further release step after that shown in FIG. 7, wherein the adhesive layer that was adhered to the mounting object is entirely debonded while a corresponding portion of the adhesive layer adhering to the substrate surface is still adhered;

DETAILED DESCRIPTION OF THE PREFERRED EMBODIMENTS

Figure 9:
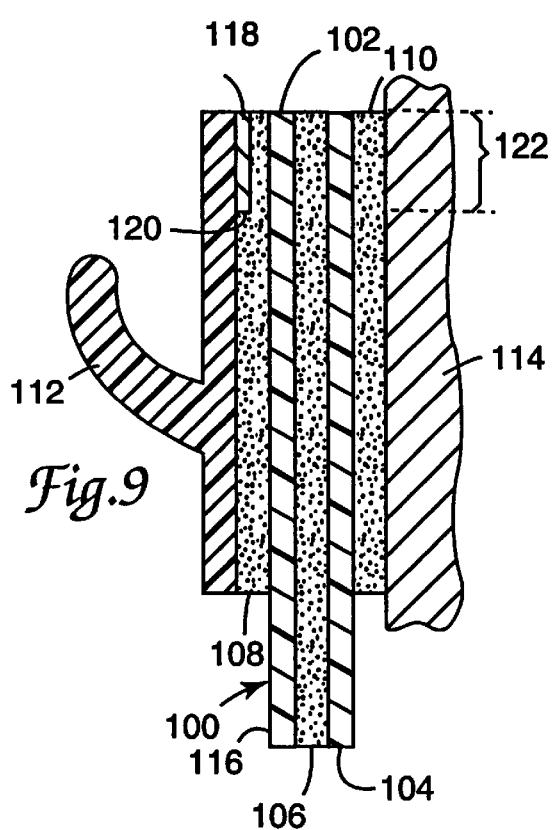
FIG. 9 is an enlarged side view in cross-section of a second embodiment of an adhesive tape construction in accordance with the present invention comprising a film/foam laminate.

With reference to the Figures, wherein like numerals are used to designate like components throughout, and initially to FIGS. 1–3, a first adhesive tape construction will be described. The first adhesive tape construction 1 is particularly designed for stretching the entire tape 1 to effect debonding, as will be more fully described below. The tape 1 comprises a backing layer 12 and adhesive layers 14 and 16 of the same or different pressure-sensitive adhesive compositions on opposite major surfaces thereof Adhesive layers 14 and 16 are preferably protected by liners 18 and 20, respectively, before the adhesive tape 1 is put into use. As illustrated, the backing layer 12 comprises a polymeric foam layer. The backing layer 12 can alternatively comprise a polymeric film layer. The choice of polymeric foam or polymeric film depends on the specific application for the tape 1. Polymeric foams can be chosen to optimize conformability and resiliency properties which are helpful when the tape 10 is to be adhered to surfaces having surface irregularities. Such is the case with a typical wall surface. Polymeric films may be used instead to increase load bearing strength and rupture strength of the tape; however, films are more suitable when the application is to adhere two very smooth surfaces together. As an alternative, solid adhesives can be used instead of the combination of a film or foam with two adhesive layers. Known stretchable solid adhesives which are generally elastic in nature and usable include rubber-based and acrylate-based solid adhesives.

A feature of the present invention which permits a controlled sequential release, described below, is accomplished by the provision of a release strip 22, which is preferably positioned at a distal or second end 24 of the tape 1 away from a tab portion 26 adjacent an opposite first end of the tape 1. The tab 26 provides a means by which the backing layer 12 can be gripped by a user for effecting the stretch release of the tape 1.

The purpose of the release strip 22 is to provide a non-adhesive zone of one of the adhesive layers 14 or 16 at the effective or functional end (distal or second end 24 as shown in FIG. 1) of the tape 1. According to the FIG. 1 embodiment, the release strip 22 can comprise a portion of the liner 18 which is simply cut from the liner 18 as shown at 28. In other words, release strip 22 may comprise the same material as the liner 18. Also, the release strip 22 preferably covers the entire transverse width of the tape 1, the purpose of which is to provide a non-adhesive zone so that when the tape 1 is applied after liners 18 and 20 are removed, release strip 22 prevents the covered portion of adhesive 14 or 16 from adhering to any surface.

Alternatively, as shown in FIG. 2, a tape 10 can comprise a release strip 30 separately provided to cover a portion of adhesive layer 14 or 16. As shown, the release strip 30 covers a portion of adhesive layer 14 and is provided separately from a liner 32. The liner 32 is illustrated covering the release strip 30; however, the liner 32 need not necessarily cover release strip 30. The release strip 30 can comprise a silicone release paper which may be the same or different from the material of the liner 32, or may comprise any conventional material for rendering a portion of the adhesive 14 or 16 non-adhesive. It is conventionally known to use materials such as films, papers, powders, foams, inks, other coatings and treatments, and the like as a layer or coating over the relevant portion of the adhesive for rendering that portion of the adhesive non-adhesive. Films that adhere strongly to the adhesive layer 14 or 16 are preferred so as not to release during application, and include polyester materials such as polyethylene terephthalate (PET).

As an alternative to rendering a portion of an adhesive layer non-adhesive, as shown in tape construction 10' of FIG. 3, a non-adhesive portion 34 can be provided by simply not coating the adhesive layer 36 all the way to the distal end 38 of the adhesive tape. As shown, a liner 40 may also preferably be provided which ends at the end of adhesive layer 36, although it may extend further to cover the non-adhesive portion 34.

A specific mounting or joining application for the tape 10, of FIG. 2, in accordance with the present invention is shown in FIG. 4. Tape 10 is shown positioned between and adhered to a mounting object, specifically a hook 42, and a substrate, such as a wall, shown partially at 44. With reference to the tape construction of tape 10 shown in FIG. 2, adhesive layer 16 is adhered to the hook 42 while adhesive layer 14 is adhered to the wall 44. Adhesive layer 16 preferably corresponds with the surface of the hook 42 to which it is adhered such that tab 26 extends from the hook 42 to facilitate stretch removal of the tape 10. Likewise, adhesive layer 14 is preferably similarly configured. In this application, the release strip 30 is positioned against a portion of the wall 44 corresponding to an end portion of hook 42 away from tab 26. As will be more fully understood with the description below, the mounting configuration of FIG. 4 will permit a sequential release of the double-sided adhesive tape structure 10 first from the wall 44 and then from the hook 42 during stretch release. The release strip 30 effectively prevents bonding in that area and therefore releases the tape 10 from the wall 44 when the stretch release progresses up to the inner leading edge 46 of the release strip 30. The release of adhesive layer 16 progresses substantially evenly with the release of adhesive layer 14 so that a portion 50 of adhesive layer 16 is still adhered to the hook 42 when the stretch release progresses to the inner leading edge 46 of release strip 30 at which instance the adhesive layer 14 is entirely released then from wall 44.

FIG. 5 shows the same tape 10 of FIG. 2, in a similar application as in FIG. 4, but with the adhesive tape 10 reversed between hook 42 and the wall 44. Specifically, adhesive layer 14 is adhered to the back surface of hook 42 and adhesive layer 16 is adhered to the wall 44. Tab 26 extends from under the hook 42 to facilitate stretch removal, and the release strip 30 is positioned against the effective end of the back surface of hook 42 and at the end of tape 10 away from tab 26. More preferably, release strip 30 lies against the back surface of hook 42 away from tab 26 completely to the edge of the back surface of hook 42. Again, as will be detailed below, a progressive stretch release will cause adhesive layers 14 and 16 to simultaneously debond from the tab end 26 toward the release strip 30. In the FIG. 5 case, when the stretch release of adhesive layer 14 progresses to the inner leading edge 46 of the release strip 30, the adhesive layer 14 will be completely debonded from hook 42. At the point where stretch release progresses to the inner leading edge 46 of release strip 30, a portion 48 of adhesive layer 16 will still be attached to the wall 44.

Such progressive stretch release and removal of an object such as hook 42 from a wall 44, is illustrated in FIGS. 6, 7, and 8. Starting with FIG. 6, after a force F is applied to tab 26, the backing layer 12 making up tab 26 is stretched. FIG. 6 shows the tape 10 with the tab 26 stretched but just before any debonding of adhesive layers 14 or 16. As continued force F is applied to the tab 26, and as shown in FIG. 7, a progressive debonding of adhesive layers 14 and 16 from the surfaces of hook 42 and wall 44 occurs. FIG. 7 shows such a progressive debonding at about the point of the half-way debonding of both adhesive layers 14 and 16. As can be seen, as the backing 12 is stretched, the adhesive layers 14 and 16 stretch and pull away from their respective surfaces and debond. FIG. 8 shows the point of progressive debonding where the debonding of adhesive layer 14 reaches the inner leading edge 46 of release strip 30. At this point, the release strip 30, together with the progressive adhesive stretching up to inner leading edge 46, entirely releases the surface of hook 42 from the tape 10. Meanwhile, a portion 48 of adhesive layer 16 is still adhered to the wall 44.

In the situation just described, where release strip 30 is positioned to lie against the back surface such as hook 42, the stretch release of tape 10 permits the hook 42 to simply fall or be easily removed from its mounted position on the wall 44 while the tape 10 is still adhered to the wall 44. This way, no additional force which otherwise might tend to catapult the hook 42 is exerted onto the hook 42 by the stretched tape 10 at the point of complete debonding of the hook 42 from tape 10. After hook 42 is released, continued stretching will simply cleanly release the remainder portion 48 of adhesive layer 16 from wall 44. Alternatively, the remaining portion 48 could simply be peeled from the wall 44.

In removing the hook 42 from the surface of wall 44 with the tape 10 applied in the manner shown in FIG. 4, one would hold onto the hook 42 with one hand while the adhesive tape 10 is stretched to remove the hook from the wall surface. Stretching of the tape 10 eventually progresses to the point of the inner leading edge 46 of release strip 30 where complete debonding of the adhesive layer 14 from the surface of wall 44 will occur resulting in the removal of the hook 42. At this point, however, the area 50 of adhesive layer 16 of the tape 10 corresponding to the release strip 30 of adhesive layer 14 still remains adhered to the back of hook 42. In this way, the risk of snap-back of the tape 10 is substantially eliminated, which is particularly problematic when the backing layer or solid adhesive layer is elastic. Once the hook 42 is removed from the wall 44, the remaining adhesive tape 10 can be stretched and cleanly removed from the hook 42. Alternatively, the remaining portion 50 of tape 10 can be peeled from the hook 42, although it is preferred to complete the stretch removal so that no residue is left on the surface of hook 42 and the hook 42 can be reused.

In either application shown in FIGS. 4 or 5, it can be seen that the release strip 30 provides the controlled early release of one of the adhesive layers relative to the other as caused by the simultaneous progressive debonding of both adhesive layers 14 and 16 from the tab end 26 up until the debonding reaches the inner leading edge 46 of the release strip 30. The length of the release strip 30 (the longitudinal dimension in the direction of the cross-section of the Figures) thus determines how early the first adhesive layer 14 releases before release of the second adhesive layer 16. Moreover, the area of release strip 30 substantially defines the size of the corresponding adhesive portions 48 and 50 which remain adhered after complete debonding of the first adhesive layer 14 during stretch release.

On the one hand, it is desirable to minimize the length of release strip 30 in order to ensure sufficient adhesive connection between the adhesive layer 14 of the tape 10 and either the hook 42 or wall 44; however, it is preferable that the length of release strip 30 be sufficient such that a total debonding of the one adhesive surface with release strip 30 occurs prior to any potential sheer failure of the adhesive making up the area of the remaining portion 48 or 50. This of course depends on the properties of the backing with respect to its Young's modulus and elongation characteristics and the specific pressure-sensitive adhesive making up the adhesive layer 16. With a low modulus material, the tape backing is more easily stretchable and less length of the release strip is required to provide the sequential debonding. With a higher modulus material, the tape backing is harder to stretch and a greater length of the release strip might be required. An additional advantage of the tape constructions described above is the reusability of mounting objects or hooks.

When utilizing a tape construction as shown in FIG. 3 at 10' having a non-adhesive portion 34 instead of a release layer, the adhesive layer 36 will completely debond from the surface to which it is attached when the adhesive layer 36 is stretched up to its trailing edge 37 defining the non-adhesive portion 34. At that instance, a corresponding portion of adhesive layer 16 will still be adhered.

A second embodiment of a sequential release tape 100 is illustrated in FIG. 9. Tape 100 comprises a polymeric foam layer 102 and a polymeric film layer 104 adhered to one another by a layer of pressure-sensitive adhesive 106. Alternatively, foam layer 102 and film layer 104 could be otherwise laminated by heat or by co-extrusion, or the like. Polymeric film layer 104 may be used to increase the load bearing strength and rupture strength of the tape 100, particularly where polymeric foam layer 102 lacks properties otherwise required in a backing to permit removal by stretching. Inclusion of the film layer 104 therefore permits greater latitude in the selection of foam layer 102 to optimize, for example, the conformability and resiliency properties. In a similar sense as the tape 10, described above, the entire tape laminate of the sequential release tape 100 is designed to be stretched for removal. The foam layer 102, film layer 104, and pressure-sensitive adhesive layer 106 constitute the backing of the tape 100. Foam layer 102 and film layer 104 also have adhesive layers 108 and 110, respectively, of the same or different pressure-sensitive adhesive compositions coated thereon for adhering tape 100 to an object such as hook 112 and the surface of a substrate such as a wall 114. Again, this tape construction is particularly suited for stretching the entire tape to effect debonding from both hook 112 and wall 114, which permits easy reusability of the hook 112. Alternatives to the employment of polymeric film layer 104 to provide the same increase in load bearing strength and rupture strength would be conventional reinforcement scrims such as non-woven scrims, plastic meshes, or the like, which should also exhibit the relevant stretch characteristics needed for the above-described embodiment.

At one end of the foam layer 102 and film layer 104, a tab 116 is formed to facilitate the stretch removal of tape 100. Tab 116 is preferably made by simply not providing adhesive layers 108 and 110 at an end region of the backing. Otherwise, a coating, film, or the like, could be applied over adhesive layers 108 and 110, if extended over the entire backing, to form the tab 116. Opposite to the end of tape 100 where tab 116 is provided, a release strip 118 is also provided covering at least an effective end portion of adhesive layer 108 or 110. The effective or functional end of tape 100 opposite from the formation of tab 116 means the portion of adhesive layer 108 or 110 which is to be covered by release strip 118 in order to cause sequential release. That is, that one surface will completely debond before the other.

Sequential stretch release occurs with tape 100 substantially the same as that described above with regard to tape 10. Specifically, as tab 116 is grasped and a force applied to stretch the release tape 100, a progressive debonding of adhesive layers 108 and 110 occurs at substantially the same time. Again, the debonding occurs substantially simultaneously by stretching adhesive layers 108 and 110 as a result of the stretching of release tape 100. When the debonding of adhesive layer 108 reaches an inner edge 120 of release strip 118, adhesive layer 108 becomes entirely debonded from the surface to which it is applied, such as the back of a hook 112 as shown in FIG. 9. At this point, an adhesive portion 122 substantially corresponding to the dimensions of release strip 118 will still remain adhered to the other surface to which the release tape 100 is applied, such as wall 114 as shown in FIG. 9. Once the adhesive layer 108 is entirely debonded from its surface, the hook 112 is removed from wall 114. Thereafter, the remaining adhesive portion 122 can be removed by continued stretching or peeling of tape 100. Stretch removal is preferred since this will not leave adhesive residue on the remaining surface of adherence. Likewise with tape 10, described above, the release strip side of the tape can be applied to the wall surface instead and would be removed in the same manner as described above with first release from the wall 114.

Figure 10:
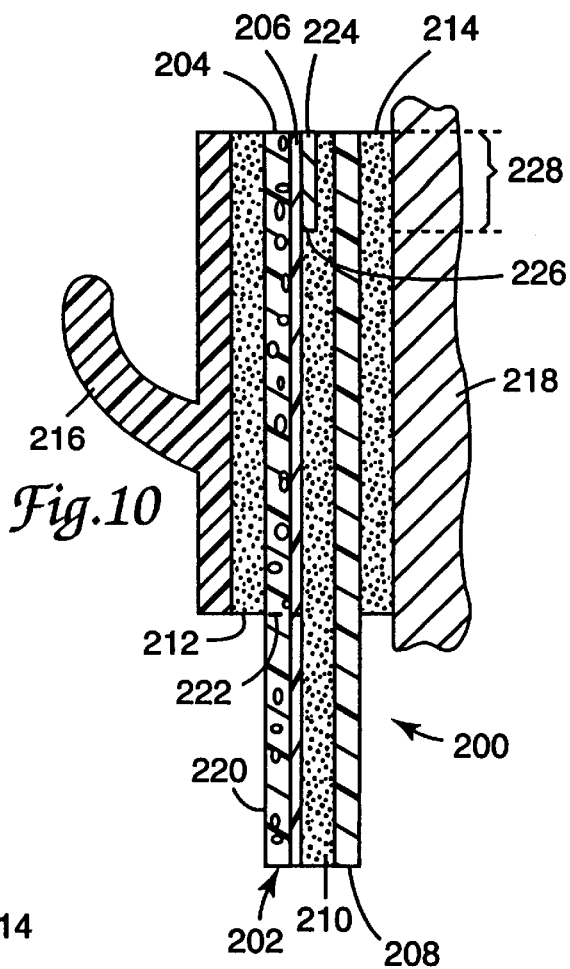
FIG. 10 is an enlarged side view in cross-section of a third embodiment of an adhesive tape construction in accordance with the present invention comprising a foam/film/film laminate.

A third embodiment of another construction for a sequential release tape 200 is illustrated in FIG. 10. Release tape 200 comprises a laminated film/foam layer 202 which is itself comprised of a polymeric foam layer 204 and a polymeric film layer 206. Preferably, polymeric foam layer 204 and polymeric film layer 206 are heat laminated to one another, although other conventional lamination methods or co-extrusion methods can be utilized, including the use of any number of adhesives. A polymeric film layer 208 is further adhered to the film/foam layer 202 by a layer of pressure-sensitive adhesive composition 210. In this construction, film/foam layer 202, polymeric film layer 208, and pressure-sensitive adhesive layer 210 constitute the tape backing. Foam layer 204 and film layer 208 bear on their major surfaces adhesive layers 212 and 214 of the same or different adhesive compositions for adhering the tape 200 to an object such as hook 216 and another surface such as wall 218.

A tab 220 is provided comprising a portion of the film/foam layer 202, film layer 208, and pressure-sensitive adhesive layer 210 by not providing adhesive layers 212 and 214 on one end of tape construction 200. It is an aspect of the tape construction 200 that only the polymeric film layer 208 and adhesive layers 210 and 214 need comprise a stretchable tape material. To facilitate this, the film/foam layer 202 is slit at 222 to define tab 220 for grasping and tape stretching. By virtue of slit 222, grasping tab 220 and stretching of release tape 200 only stretches film layer 208 and adhesive layers 210 and 214. Stretch release debonding thus occurs between adhesive layer 210 and film layer 206 and adhesive layer 214 and the surface of wall 218. In other words, adhesive layers 210 and 214 become debonded from the surfaces of film layer 206 and the wall 218. By this construction, only film layer 208 and adhesive layers 210 and 214 need have the stretch characteristics necessary for stretch release. Film layer 206 and foam layer 204 can be chosen based on other desired characteristics. Specifically, the foam can be optimized, for example, for conformability and resiliency properties. Likewise, the film layer 206 can be chosen based on load bearing strength, rupture strength, surface finish, and composition for release characteristics.

Similarly as with tape constructions 10 and 100, a release strip 224 is provided at the effective or functional end of release tape 200 away from tab 220. Again, the release strip 224 facilitates the earlier removal of one of the adhesive layers 212 or 214 prior to the other. An inner edge 226 of release strip 224 defines the point at which complete release of one adhesive layer occurs while a remaining portion 228 of adhesive remains adhered to the other surface. In the specifically illustrated embodiment, release of adhesive layer 210 from film layer 206 occurs prior to the release of adhesive layer 214 from the surface of wall 218.

Suitable materials for the foam layer 204 and film layer 206 can be any materials that are generally suitable for tape backings and can be chosen to optimize the characteristics noted above. Preferably, layer 204 comprises a polymeric foam material. Likewise, film layer 206 preferably comprises a polymeric film. Other suitable materials may include paper layers or paper products, non-woven webs, foils, and the like. Suitable materials for the release strip are any of those described above with reference to tape 10 of the first embodiment, specifically including a non-adhesive portion provided instead.

Figure 11:
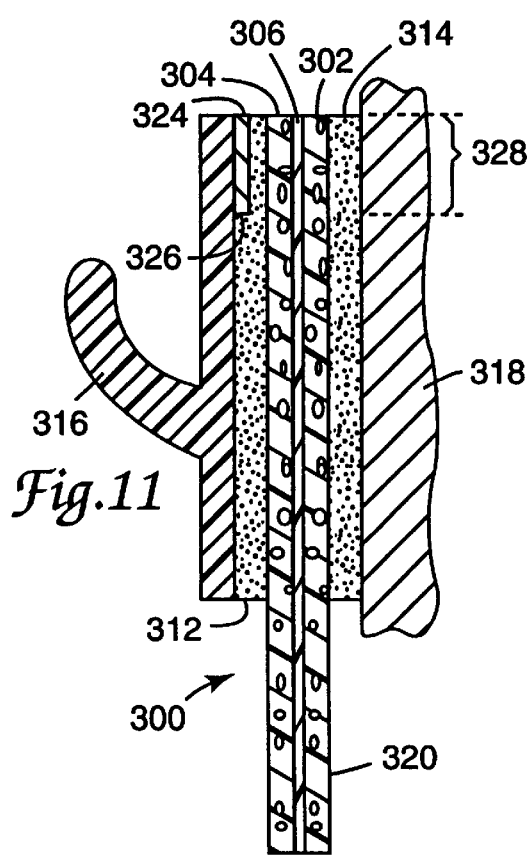
FIG. 11 is an enlarged side view in cross-section of a fourth embodiment of an adhesive tape construction in accordance with the present invention comprising a foam/film/foam laminate.

A fourth embodiment of another construction for a sequential release tape 300 is illustrated in FIG. 11. Release tape 300 comprises a stretchable backing made up of a foam/film/foam laminate including polymeric foam layer 302, polymeric foam layer 304 and polymeric film layer 306. Film layer 306 can be conventionally laminated to, co-extruded with, or adhered to foam layers 302 and 304, similarly or differently from one another. Foam layers 302 and 304 bear on their major surfaces adhesive layers 314 and 312 of the same or different adhesive compositions for adhering the tape 300 to an object such as hook 316 and another surface such as wall 318.

A tab 320 is provided comprising an extended portion of the foam/film/foam backing, preferably by not providing adhesive layers 312 and 314 on one end of tape construction 300. A release strip 324 is provided at the effective or functional end of release tape 300 away from tab 320. The release strip 324 provides the controlled early debonding of one of adhesive layers 312 and 314 prior to the other. Inner leading edge 326 of release strip 324 defines the point at which complete debonding of one adhesive layer occurs (adhesive layer 312, as illustrated) while a remaining portion 328 of adhesive remains (of adhesive layer 314, as illustrated) adhered to its surface (wall 318). Tape construction 300 permits the foam layers, which can be the same or different, to be collectively or individually optimized for conformability and resiliency to their respective surfaces for adherence. As above, the film layer can be selected to enhance elongation, load bearing strength, and rupture strength.

Figure 12:
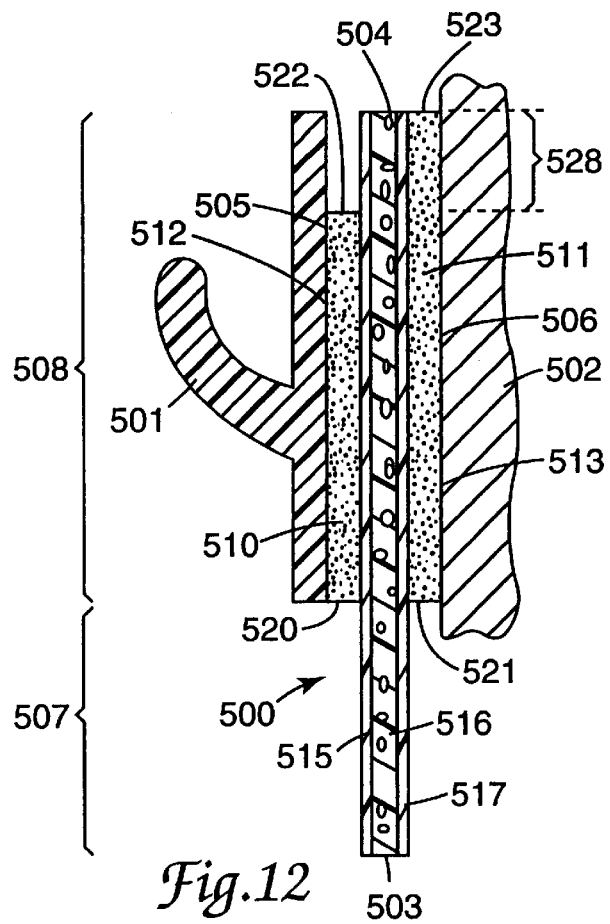
FIG. 12 is an enlarged side view in cross-section of a fifth embodiment of an adhesive tape construction in accordance with the present invention comprising a film/foam/film laminate.

A fifth embodiment of a sequential release tape 500 according to the present invention for attaching structures such as a hook 501 and a wall 502 to each other is illustrated in FIG. 12. The release tape 500 has first and second opposite ends 503 and 504 spaced in a first direction, opposite first and second outer surfaces 505 and 506 extending between those ends 503 and 504, a manually engageable tab portion 507 adjacent its first end 503, and an attachment portion 508 between its tab portion 507 and its second end 504. The attachment portion 508 comprises two layers 510 and 511 of aggressive pressure sensitive adhesive of the same or different adhesive compositions providing an adhesively aggressive portion (512 and 513 respectively) of each of the outer surfaces 505 and 506. The layers 510 and 511 of adhesive are adhered along opposite major surfaces of a stretchable backing that is a film/foam/film laminate including a polymeric film layer 515, a polymeric foam layer 516 and a polymeric film layer 517. The film layers 515 and 517 can be conventionally laminated to, co-extruded with, or adhered to the opposite sides of the foam layer 516. Each adhesively aggressive surface portion 512 or 513 has a primary end (520 and 521 respectively) adjacent the first end 503 of the tape 500 and a secondary end (522 and 523 respectively) adjacent the second end 504 of the tape 500 and is adapted to be firmly adhered to a different one of the structures between its primary and secondary ends 520, 522; 521; 523. The attachment portion 505 is stretchable so that when the attachment portion 508 is between and adhered to the structures 501 and 502 as illustrated in FIG. 12 it can be progressively stretched along its length by the manual application of force to the tab portion 507 to cause separation of the adhesively aggressive surface portions 512 and 513 from the structures progressively from their primary ends 520 and 521 towards their secondary ends 522 and 523. The secondary ends 522 and 523 of the adhesively aggressive surface portions 512 and 513 are spaced from each other in said first direction to cause essentially complete separation of the adhesively aggressive surface portion 512 from the structure or hook 501 prior to separation of the other adhesively aggressive surface portion 513 from the other structure or wall 502. That spacing is caused in that the ends adjacent the tape's second end 504 of the layers 510 and 511 of aggressive adhesive on both major surfaces of the backing layer that define the secondary ends 522 and 523 of the adhesively aggressive surface portions 512 and 513 extend to different locations with respect to the second end 504 of the tape 500 to space the secondary ends 522 and 523 of the adhesively aggressive portions 512 and 513 of the outer surfaces 505 and 506 from each other.

The tape 500 thus provides controlled early debonding of the adhesive layer 510 prior to the adhesive layer 511. The secondary end 522 of the layer 510 of adhesive 510 defines the point at which complete debonding of the adhesive layer 510 occurs while a remaining portion 528 of the adhesive layer 511 remains adhered to the wall 502. The foam layer 516 can be optimized for conformability and resiliency to facilitate adhesion of the adhesive layers 510 and 511 to surfaces such as those of the hook 501 and the wall 502. The film layers 515 and 517 can be selected to enhance elongation, load bearing strength, and rupture strength.

In view of the foregoing embodiments, it is evident that many modifications for other embodiments are possible combining various layers which are together optimized for a particular application. In general, foams are preferred to add resiliency and conformability, while films improve load bearing and rupture strength. For components of stretchable backing layers, the combined backing must be sufficiently extensible for debonding to occur but of sufficient tensile strength so as not to rupture during debonding. For component layers that need not be stretched, as in FIG. 10, many other options exist as defined by the application and compatibility of the layers.

It is also contemplated that more layers (films, foams, etc.) can be provided in any number of ways depending on the application.

As an alternative to each of the aforementioned embodiments expressly disclosed and/or suggested, it is also contemplated that the non-adhesive portion of one of the adhesive layers of a double-sided tape construction (whether non-adhesive as in FIG. 3 or rendered non-adhesive by a release strip or the like) can instead comprise a low-adhesion portion. Such a construction provides a differential debonding and release. By low-adhesion, it is meant that there is a weaker or less aggressive adherence between the adhesive of that portion and the surface to which it adheres as compared to the adherence of the adjoining adhesive layer to its substrate. In one case, the release strip or non-adhesive portion of the above embodiments could be substituted with a composition of less aggressive adhesion material. Such low-adhesion material can be applied directly to the relevant backing layer or may be coated to the surface of the adjoining adhesive layer.

Any adhesive composition exhibiting a lower adhesion than the adjoining adhesive layer is contemplated, including the other compositions of the adhesive materials listed below. Moreover, adhesive detackification or coating techniques can be utilized. One specific example of a low-tack adhesive deemed suitable for many applications is the adhesive used in making Post-it™ repositionable notes which are commercially available from Minnesota Mining and Manufacturing Company of Saint Paul, Minn. Although the use of a low-adhesion portion will not provide complete debonding of one adhesive surface prior to the other of a double-sided stretchable tape construction, it can essentially accomplish that task. The one side will substantially debond and in any case will be easier to remove than the remaining adhesive portion corresponding on the other side of the double-sided stretchable tape construction. At least to some degree, the effects of snap-back and catapulting, discussed above, will be lessened.

Instead of using a less aggressive adhesive composition to define a low-adhesion portion, the surface to which the relevant portion (for early release) of the object or wall, etc. can be modified to reduce its affinity for the adhesive of one of the adhesion layers of a double-sided stretchable tape. For example, the end section of the surface of a hook or object to be bonded can be coated with a release material such as a silicone release coating. Alternatively, a differential adhesive area on the hook or object may be produced through molding or profiling of a textured area which significantly reduces adhesive contact. An advantage of this is that the adhesive layers of the double-sided stretchable tape need not be themselves modified.

Yet another way of accomplishing sequential release can be controlled by positioning of the hook or object relative to a stretchable double-sided adhesive tape without a differential low-adhesive portion, or a non-adhesive portion (rendered or not). In this regard, reference is made to FIG. 13. A tape 400 is illustrated, which is similar to the tape of FIG. 1 but with no provision for making a non-adhesive or low-adhesion portion. Tape 400 comprises a stretchable backing 402 and adhesive layers 404 and 406 of the same or different pressure-sensitive adhesive. Stretchable backing 402 can comprise a foam, film or the like, as set out above, or any of the possibilities for laminates and alternate constructions suggested above.

Tape 400 is shown with adhesive layer 404 adhered to the surface of an object, hook 408, and adhesive layer 406 adhered to another substrate, such as wall 410. A tab for stretching is shown as 412, In order to provide a sequential release, the surface of hook 408 is adhered to adhesive layer 404 but offset inward from a distal end 414 of tape 400. In this way, the surface of hook 408 will completely debond while leaving a portion 416 of the adhesive layer 406 adhered to the surface of wall 410. Again, stretch removal occurs by applying a force to tab 412 away from the object and subsequent stretching of the backing 404 and adhesive layers 404 and 406 with substantially simultaneous progressive debonding. When debonding of adhesive layer 404 reaches the upper edge of the surface of hook 408, the hook 408 is completely debonded, while portion 416 remains adhered.

Figure 13:
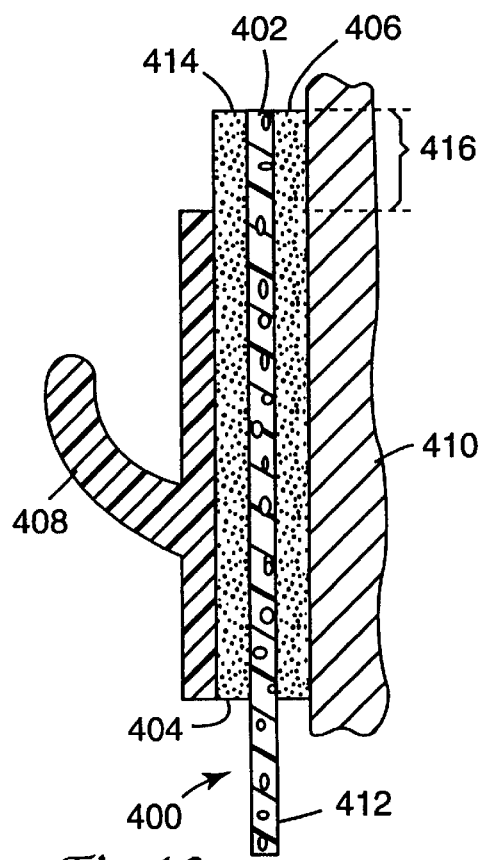
FIG. 13 is an enlarged side view in cross-section of the sequential release tape construction in accordance with the present invention showing an alternative mounting application.

It is also contemplated that the manner of application illustrated in FIG. 13 and described above can be done in combination with non-adhesive portions, release strips, or low-adhesion portions as described above.

Suitable materials for any of the stretchable layers described in any of the embodiments above include any materials which are stretchable without rupture by at least 50 percent elongation at break and which have sufficient tensile strength so as not to rupture before debonding. Again, such stretchable materials may be either elastically deformable or plastically deformable provided sufficient stretching is possible to cause adhesive debonding of both adhesive surfaces for stretch removal.

Suitable plastic backing materials are disclosed in U.S. Pat. No. 5,516,581 (Kreckel et al) and co-pending application U.S. Ser. No. 08/308,937 (Bries et al.) which are commonly owned by the Assignee of the present application, and the complete disclosures of which are hereby incorporated by reference.

Representative examples of materials suitable for either a polymeric foam or solid polymeric film layer in the backing of the tape of this invention of the type utilizing a plastic backing include polyolefins, such as polyethylene, including high density polyethylene, low density polyethylene, linear low density polyethylene, and linear ultra low density polyethylene, polypropylene, and polybutylenes; vinyl copolymers, such as polyvinyl chlorides, both plasticized and unplasticized, and polyvinyl acetates; olefinic copolymers, such as ethylene/methacrylate copolymers, ethylene/vinyl acetate copolymers, acrylonitrile-butadiene-styrene copolymers, and ethylene/propylene copolymers; acrylic polymers and copolymers; polyurethanes; and combinations of the foregoing. Mixtures or blends of any plastic or plastic and elastomeric materials such as polypropylene/polyethylene, polyurethane/polyolefin, polyurethane/polycarbonate, polyurethane/polyester, can also be used.

Polymeric foam layers for use in the plastic backing of the tapes of the invention generally will have a density of about 2 to about 30 pounds per cubic foot (about 32 to about 481 kg/m$^3$), particularly in tape constructions where the foam is to be stretched to effect debonding.

Preferred for plastic polymeric foam layers in the backing of the tapes of the invention are polyolefin foams. Polymeric foam layers are most preferably polyolefin foams available under the trade designations Volextra™ and Volara™ from Voltek, Division of Sekisui America Corporation, Lawrence, Mass.

Elastomeric materials suitable as backings for tapes in accordance with the present invention include styrene-butadiene copolymer, polychloroprene (neoprene), nitrile rubber, butyl rubber, polysulfide rubber, cis-i,4-polyisoprene, ethylene-propylene terpolymers (EPDM rubber), silicone rubber, polyurethane rubber, polyisobutylene, natural rubber, acrylate rubber, thermoplastic rubbers such as styrene butadiene block copolymer and styrene-isoprene-styrene block copolymer and TPO rubber materials.

Solid polymeric film backings are preferably selected from polyethylene and polypropylene films, with the most preferred materials being unoriented linear low density and ultra low density polyethylene films. A preferred polyethylene film is that available under the trade designation Maxilene™ 200 from Consolidated Thermoplastics Company, Schaumburg, Ill.

The backing may vary in overall thickness so long as it possesses sufficient integrity to be processable and handleable and provides the desired performance in respect to stretching properties for debonding the backing or tape from a surface. The specific overall thickness selected for a backing will depend upon the physical properties of the polymeric foam layer or layers and any solid polymeric film layer forming the backing. Where only one polymeric film or foam layer of a multi-layer backing is intended to be stretched to effect debonding, that layer should exhibit sufficient physical properties and be of a sufficient thickness to achieve that objective.

A plastic polymeric film layer such as is contained in the constructions of FIGS. 9, 10, and 11 preferably will be about 0.4 to 10 mils in thickness, and will most preferably be about 0.4 to 6 mils in thickness.

The adhesive of the adhesive layers, excluding adhesives usable for the low-adhesion portion of a differential release tape, can comprise any pressure-sensitive adhesive, with the particular adhesion properties being dependent on the use of the tape, with the preferred adhesion properties generally ranging from about 4 N/dm to about 200 N/dm, preferably from about 25 N/dm to about 100 N/dm, at a peel angle of 180°, measured according to PSTC-1 and PSTC-3 and ASTM D 903-83 at a peel rate of 12.7 cm/min. Adhesives having higher peel adhesion levels usually require backings having higher tensile strength.

Pressure-sensitive adhesives suitable for application to one side of the backing and/or the other in the tapes of the invention include tackified rubber adhesives, such as natural rubber; olefins; silicones; synthetic rubber adhesives such as polyisoprene, polybutadiene, and styrene-isoprene-styrene, styrene-ethylene-butylene-styrene and styrene-butadiene-styrene block copolymers, and other synthetic elastomers; and tackified or untackified acrylic adhesives such as copolymers of isooctylacrylate and acrylic acid, which can be polymerized by radiation, solution, suspension, or emulsion techniques. Preferred are synthetic rubber adhesives or acrylics.

The thickness of each adhesive layer can range from about 0.6 mils to about 40 mils (about 0.015 mm to about 1.0 mm), preferably from about 1 mils to about 16 mils (about 0.025 mm to about 0.41 mm). In this preferred range of thicknesses, the thicker layers tend to cause the tapes to be more easily removable than do thinner layers. This is in contrast to conventional methods of removal, such as removal by peeling at peel angles of 90° or higher. In general, thicker layers of adhesive tend to cause the tapes to exhibit higher peel strength at a peel angle of 180° than do thinner layers. When the tapes of the present invention are released by stretching at a low angle, i.e., under 35°, the adhesive tends to be constrained by the backing and substrate for a single-coated adhesive tape and by the backing and two substrates for a double-coated adhesive tape, and is forced to undergo significant elongation. Under these conditions, the adhesive layer (or each adhesive layer) contracts, which reduces its cross-sectional area. Since the cross-sectional area, i.e., thickness times width, of a thinner layer of adhesive is already less than that of a thicker layer of adhesive, stress, i.e., force per unit area, is greater in the thinner layer of adhesive than in the thicker layer of adhesive. This leads, in effect, to a stiffening of the adhesive. Because stiffer layers offer more resistance to deformation, the force required for debonding is greater. The exposed adhesive layer or layers may be laminated to a conventional release liner prior to use.

Adhesives for adhering one polymeric foam layer to either another polymeric foam layer or a solid polymeric film layer include those pressure-sensitive adhesive compositions described above. Preferably the adhesive layer for adjoining one polymeric layer of the backing to another will be about 1 to 10 mils (about 0.025 to 0.25 mm) in thickness. Other methods of adhering the polymeric layers of the backing to one another include such conventional methods as co-extrusion or heat welding.

The tape of this invention can be produced by any conventional method for preparing pressure-sensitive adhesive tapes. For example, the adhesive can either be directly coated onto the backing, or it can be formed as a separate layer and then later laminated to the backing.

Removing the tape from the surface of a substrate can be carried out by simply stretching the tape in a direction up to an angle of about 35° from the surface. Preferably, the tape can be removed from the surface of a substrate by stretching the tape at an angle of no greater than about 10°. Removal at the appropriate angle will result in leaving no substantial or appreciable adhesive residue and in preventing the surface of the substrate from being damaged.

Debonding of a highly elongated adhesive tape of this invention at low angles is characterized by a "sharp" type of crack propagation. Like fracture of glassy materials, a sharp crack leads to high stress concentration at the crack front, where there is a low volume of adhesive material (in which stress may be dissipated). High stress concentration at the crack front leads to what is called brittle cleavage failure of the adhesive. Such failure typically occurs with low force (because of the low amount of energy dissipated in the adhesive material) and is cleanly interfacial.

In contrast, for higher peeling angles, i.e., angles generally greater than 35°, the backing tends not to stretch and the adhesive tends to undergo filamentation and rupture cohesively. Like fracture of glassy materials, propagation of a "blunt" crack is preceded by crazing. In this model, the observed filamentation of the adhesive at higher angles serves principally as an energy dissipation mechanism, analogous to craze fibrils found in glassy materials. The greater the energy dissipation, the greater the resistance to peeling and the higher the force required to peel the tape. A larger volume of material is involved in energy dissipation, and, as stated previously, stress is less concentrated. The adhesive filaments rupture cohesively to leave residue of adhesive on the surface or to cause damage to the surface.

The tape of this invention can be used in several areas, including the following categories:

(1) mounting applications on surfaces such as painted wallboard, plaster, concrete, glass, metal or plastic, such as wall hangings, dispensers, wire clips, body side molding on vehicles, carrying handles, signing application, e.g., road signs, vehicle markings, transportation markings, and reflective sheetings, etc.;

(2) joining or assembly applications;

(3) cushioning or sound deadening applications, such as cushioning materials for placement beneath objects or sound insulative sheet materials;

(4) closure applications, such as container closures, e.g., box closures, closures for food and beverage containers, and the like; diaper closures; surgical drape closures; and the like; and (5) removable labels, such as price tags or identification labels on containers.

The particular construction of the tape, e.g., the type of backing, the type of adhesive compositions, and relative position of backing and adhesive layers, are often required to be different for each category of use.

Preferred hook configurations for use in combination with a tape of this invention for mounting applications are described in U.S. Pat. No. 5,507,464 (Hammerski et al) which is incorporated herein by reference. A particularly preferred hook configuration is that illustrated in FIG. 7 and FIG. 8 of that patent. Other preferred picture hanger and wire clip configurations are disclosed in U.S. Ser. No. D-29/027,822 (abandoned); U.S. Ser. No. D-29/029,272 (abandoned); and U.S. Ser. No. D-29/029,273 (abandoned) which were filed on Aug. 30, 1994, are commonly assigned, and are incorporated herein by reference. Other preferred hook configurations are disclosed in co-pending application U.S. Ser. No. D-29/039,674 filed on Jun. 1, 1995, which is commonly assigned and incorporated herein by reference.

Test Methods for Testing Tapes of the Invention

Painted Wallboard Test Panels

U.S. Gypsum ⅜" (9.5 mm) sheetrock was painted first with Sherwin Williams ProMar™ 200 interior latex primer, then with a single top coat of Sherwin Williams Classic™ 99 interior flat latex wall paint. The painted wallboard was aged under ambient conditions at about 22° C. for a minimum of 48 hours prior to use for testing.

Adhesive Residue

The amount of adhesive residue remaining on the painted wallboard was determined by visual inspection.

Surface Damage

The occurrence of any damage to the surface of the painted wallboard was determined by visual inspection.

---

Adhesive Compositions Used for Preparing Tapes of the Invention

A. Composition:

| | |
|---|---|
| Kraton ™ 1118 | 75 pts |
| Finaprene ™ 1205 | 25 |
| Piccolyte ™ A-135 | 101 |
| Shellflex ™ 371 | 20 |

Kraton ™ 1118 is a styrene-butadiene block copolymer available from Shell Chemical Co.
Piccolyte ™ A135 is an alpha pinene resin available from Hercules Chemical Co.
Shellflex ™ 371 is a naphthenic oil available from Shell Chemical Co.

B. Composition of Example 2 of U.S. Pat. No. 4,699,842, incorporated herein by reference, as follows:

| | |
|---|---|
| Kraton ™ 1657 | 5.00 pts |
| Regalrez ™ 1078 | 5.00 |
| Regalrez ™ 1018 | 1.50 |
| Triton ™ X-100 | 0.16 |
| Triton ™ X-200 | 0.30 |
| Toluene | 17.80 |
| Irganox ™ 1076 | 0.12 |
| Cyanox ™ LTPD | 0.12 |
| Water | 5.90 |
| Isooctyl acrylate/ octylacrylamide/ sodium styrene sulfonate terpolymer (87:12:1) | 64.10 |

Kraton ™ 1657 is styrene-ethylene-butylene-styrene elastomer from Shell Chemical Company.
Regalrez ™ 1078 is a tackifier resin available from Hercules Incorporated.
Regalrez ™ 1018 is a tackifier resin available from Hercules Incorporated.
Triton ™ X-100 is non-ionic surfactant available from Rohm and Haas Co.
Triton ™ X-200 is an anionic surfactant available from Rohm and Haas Co.
Irganox ™ 1076 is a phenolic based anti-oxidant available from Ciba-Geigy.
Cyanox ™ LTPD is a phenolic based anti-oxidant available from American Cyanamide Co.

C. Composition of Example 1 of U.S. Pat. No. 5,143,972, incorporated herein by reference, prepared by combining Part A and Part B as follows:

Part A

| | |
|---|---|
| Kraton ™ 1657 | 11.150 pts |
| Regalrez ™ 1018 | 8.360 |
| REZ-D ™ 2084 | 13.940 |
| Irganox ™ 1076 | 0.112 |
| Cyanox ™ LTPD | 0.112 |
| Tinuvin ™ 328 | 0.033 |
| Uvinol ™ 400 | 0.033 |
| Toluene | 41.260 |

Part B Reaction product of:

| | |
|---|---|
| Isooctylacrylate | 8.800 pts |
| Acrylamide | 0.250 |
| Acrylic Acid | 0.250 |
| 2-Polystyrylethyl methacrylate | 1.350 |
| Ethyl Acetate | 7.650 |
| Methyl Ketone | 1.700 |
| Toluene | 5.000 |

REZ-D ™ is a tackifier resin available from Hercules Incorporated.
Tinuvin ™ 328 is an ultraviolet inhibitor available from Ciba-Geigy Corp.

---

-continued

Adhesive Compositions Used for Preparing Tapes of the Invention

D. Composition:

| | |
|---|---|
| Finaprene ™ 1205 | 7.095 |
| Finaprene ™ 411 | 13.176 |
| Piccolyte ™ A-135 | 20.270 |
| Shellflex ™ 371 | 2.027 |
| Ethanox ™ 330 | 0.405 |
| Toluene | 57.027 |

Finaprene ™ 1205 is a styrene-butadiene tapered di-block copolymer available from Fina Oil and Chemical Co.
Finaprene ™ 411 is a radial styrene-butadiene-styrene block copolymer available from Fina Oil and Chemical Co.
Ethanox ™ 330 is a phenolic based antioxidant available from Ethyl Corp.

E. Composition:

| | |
|---|---|
| Kraton ™ 1107 | 100.0 pts |
| Wingtack ™ Extra | 100.0 |
| Irganox ™ 1076 | 1.5 |
| Cyanox ™ LTPD | 1.5 |

Kraton ™ 1107 is a styrene-isoprene-styrene block copolymer available from Shell Chemical Co.
Wingtack ™ Extra is a hydrocarbon resin tackifier available from The Goodyear Tire and Rubber Co.

F. Composition:

2-mil and 5-mil adhesive transfer tapes available under the trade designations Scotch ™ VHB F-9460PC and F-9469PC, respectively, from Minnesota Mining and Manufacturing Company of Saint Paul, Minnesota.

G. Composition: 2-mil and 5-mil adhesive transfer tapes available under the trade designations Scotch™ F-9752PC and F-9755PC, respectively, from Minnesota Mining and Manufacturing Company of Saint Paul, Minn.

EXAMPLES

Example 1

A tape construction of the type described above with reference to FIG. 2 was prepared as follows:

A 1 inch (2.54 cm) by 1 inch (2.54 cm) piece of double coated pressure-sensitive adhesive foam tape was prepared from 3M brand VHB™ 4945 double-coated pressure-sensitive adhesive foam tape, available from Minnesota Mining and Manufacturing Company of Saint Paul, Minn. The double-coated adhesive foam tape piece 10 was adhered to the back of a plastic hook 42 (as in FIG. 4) in such a manner as to provide an extended foam tab 26. The standard silicone release paper provided on the 4945 tape was removed from the adhesive layer 14 and piece of that release paper was cut to a dimension of ¼ inch (0.635 cm) by I inch (2.54 cm) and reapplied as a release strip 30 to the top portion the adhesive layer 14 opposite from the tab 26. Next, the adhesive layer 14 was adhered to a painted wallboard test panel, as described above. While holding onto the hook 42 with one hand, the adhesive foam tape 10 was stretched to remove the hook 42 from the surface of wall 44. Continued stretching of the tape 10 progressed to the point where complete debonding of the adhesive 14 from the wall surface occurred resulting in the removal of the hook 42. However, the area of the foam tape 50 directly opposite the side to which the release paper was applied still remained adhered to the back of the plastic hook. Once the hook 42 was removed from the wall 44, the remaining adhered foam tape, ¼ inch by 1 inch area (0.635 cm×2.54 cm) was stretched and removed from the hook 42. The sequential release of the tape 10 when stretched removed cleanly from the painted drywall surface with no snap-back of the tape at debond.

Example 2

A tape was made according to FIG. 9 using a Volara™ 12E, 1/32 inch thick polyethylene vinyl acetate copolymer foam available from Voltek Division of Sekisui America Corporation of Lawrence, Mass. as layer 102, a 2 mil Maxilene™ 200 linear low density polyethylene film available from Consolidated Thermoplastics, Inc. of Schaumburg, Ill. as layer 104. The adhesive layers 106, 108, and 110 were a 3M brand VHB™ 9473 acrylic transfer adhesive, 10 mil thickness. The release strip 118 comprised a 3/16 inch length piece of standard silicone release paper. The release strip 118 was adhered to the adhesive layer 108 at the end of tape 100 opposite from a tab 116 formed from the foam layer 102, film layer 104, and adhesive layer 106. The release strip 118 provided an area of non-adhesion of the tape 100 to the hook 112 surface. Stretching of this release tape resulted in clean removal of the adhesive layers 108 and 110 with no catapulting of the hook 112 upon removal.

Example 3

A tape construction was prepared identical to that of Example 2, except that adhesive layer 106 and foam layer 102 were omitted to provide a film-backed adhesive tape construction. This film-backed tape cleanly removed with no catapulting of the hook upon removal.

Example 4

A tape construction was prepared according to FIG. 10 using Volara™ brand 4EO, 1/16 inch thick polyethylene vinyl acetate copolymer foam 204 heat laminated to a two mil ethylene vinyl acetate copolymer film 206, which composite is available from Voltek Division of Sekisui America Corporation of Lawrence, Mass. as the film/foam laminate 202. Film layer 208 comprised a 2.5 mil Maxilene™ 200 linear low density polyethylene film available from Consolidated Thermoplastics, Inc. of Schaumburg, Ill. The release strip 224 comprised a one mil polyester film 3/16 inch in length by the tape width. Adhesive layers 210, 212, and 214 comprised a rubber resin pressure-sensitive adhesive in accordance with the adhesive compositions detailed above. The polyester film release strip was used to provide an area of non-adhesion of the adhesive layer 210 to the surface of film 206 of the film/foam laminate 202 at the end of the tape 200 away from an extended tab 220. Film/foam laminate 202 was slit at the beginning of the extended portion making the tab to form a thick tab 220, and so that only the film layer 208 and adhesive layers 210 and 214 are stretched during tape stretching. Stretch release resulted in complete debonding of adhesive layer 210 from film layer 206 with subsequent complete debonding of adhesive layer 214 from the surface of wall 218.

Example 5

A tape construction was prepared according to FIG. 11 using Volara™ brand 6EO, 1/32 inch thick polyethylene vinyl acetate copolymer foam heat laminated to a two mil ethylene vinyl acetate copolymer film, which composite is available from Voltek Division of Sekisui America Corporation of Lawrence, Mass. to provide layers 304 and 306, respectively. Layer 302 comprised a Volara™ brand 6EO, 1/32 inch thick polyethylene vinyl acetate copolymer foam adhered to layer 306 by a pressure-sensitive adhesive which, along with pressure-sensitive adhesive layer 312 and 314, comprised a rubber resin pressure-sensitive adhesive in accordance with the adhesive compositions detailed above. Release strip 324 comprised a one mil polyester film and was provided and the end of tape 300 opposite to a tab 320 formed by an extension of layers 302, 304, and 306. The adhesive layer 312 with the release strip 324 was adhered to a hook 316, and the adhesive layer 314 was adhered to a wallboard test panel. The sequential release of the tape 300 resulted in clean removal with no catapulting of the hook 316 upon removal.

Example 6

A tape 500 of the type illustrated in FIG. 12 was prepared. The foam used in layer 516 was Volara™ brand 6EO, 1/32 inch thick polyethylene vinyl acetate copolymer foam to which was heat laminated on both sides the layers 515 and 517 of a 1.75 mil XMAX™ 161.1 linear low density polyethylene film available from Consolidated Thermoplastics, Inc. of Schaumburg, Ill. Adhesive layers 510 and 511 comprised a rubber resin pressure-sensitive adhesive in accordance with the adhesive compositions detailed above. The secondary end 523 of the adhesive layer 511 was spaced from the adjacent end of the adhesive layer 510 by about 0.18 inch or 0.46 centimeter. The adhesive layer 510 was adhered to a hook 501, and the adhesive layer 511 was adhered to a wallboard test panel 502. The sequential release of the tape 500 by pulling on the tab portion 507 resulted in clean removal with no catapulting of the hook 501 upon removal.

Example 7

A tape construction was prepared using an elastic solid adhesive product available from Beiersdorf AG of Hamburg, Germany commercially available as Tesa brand Power Strips. A release strip of 1/4 inch length and tape width was prepared from a portion of the release liner provided on the tape product and was applied to one end of the tape product away from a tab provided on the tape product. The modified tape product was applied to a hook and wall surface once with the release strip against the hook surface and a different time with the release strip against the wall surface. In both cases, sequential release resulted without snap-back or catapulting of the hook.

What is claimed is:

1. A tape adapted for attaching first and second structures to each other, said tape having first and second opposite ends spaced in a first direction, opposite first and second primary outer surfaces extending between said ends, a manually engageable tab portion adjacent said first end, and an attachment portion between said manually engageable portion and said second end comprising a layer of aggressive pressure sensitive adhesive providing an adhesively aggressive portion of each of said outer surfaces, each adhesively aggressive portion having a primary end adjacent the first end of said tape, a secondary end adjacent the second end of said tape and being adapted to be firmly adhered to a different one of said structures between said primary and secondary ends, said attachment portion being stretchable so that said attachment portion when between and adhered to said structures can be progressively stretched along its length by the manual application of force to said manually engageable portion to cause separation of said adhesively aggressive surface portions from said structures progressively from said primary ends towards said secondary ends, said secondary ends of said adhesively aggressive surface portions being spaced from each other in said first direction to cause complete separation of one of said adhesively aggressive surface portions from one of the structures substantially prior to separation of the other of said adhesively aggressive surface portions from the other of the structures.

2. A tape according to claim 1 comprising a single layer of pressure sensitive adhesive providing each of said adhesively aggressive portions of said outer surfaces and including a masking layer of material having no adhesive properties or adhesive properties that are significantly reduced from said layer of pressure sensitive adhesive adjacent said second end of the tape and extending over a part of the layer of pressure sensitive adhesive defining one of said adhesively aggressive portions of said outer surfaces to space the secondary ends of said adhesively aggressive portions of said outer surfaces from each other.

3. A tape according to claim 2 wherein said material in said masking layer is selected from the group consisting of release liner material, repositionable pressure sensitive adhesive, polymeric film, paper, powder, ink, and low adhesion backsize material.

4. A tape according to claim 1 including a stretchable polymeric backing layer having opposite major surfaces and a layer of aggressive pressure sensitive adhesive along each of said opposite major surfaces defining one of said adhesively aggressive portions of said outer surfaces.

5. A tape according to claim 4 wherein said stretchable polymeric backing layer is of a material selected from the group consisting of polymeric film, polymeric foam, polymeric film laminated to polymeric foam, and two polymeric films laminated to opposite sides of a layer of polymeric foam.

6. A tape according to claim 4 wherein the ends adjacent said second end of the layers of aggressive pressure sensitive adhesive on both major surfaces of the backing layer extend to the same location with respect to the second end of the tape, and the tape includes a masking layer of material having no adhesive properties or adhesive properties that are significantly reduced from said layer of pressure sensitive adhesive adjacent said second end of the tape and extending over a part of one of the layers of aggressive adhesive to space the secondary ends of said adhesively aggressive portions of said outer surfaces from each other.

7. A tape according to claim 6 wherein said material in said masking layer is selected from the group consisting of release liner material, repositionable pressure sensitive adhesive, polymeric film, paper, powder, ink, and low adhesion backsize material.

8. A tape according to claim 4 wherein ends adjacent said second end of the layers of aggressive adhesive on both major surfaces of the backing layer define the secondary ends of said adhesively aggressive portions of said outer surfaces and extend to different locations with respect to the second end of the tape to space the secondary ends of said adhesively aggressive portions of said outer surfaces from each other.

9. An assembly comprising a tape attaching first and second structures to each other, said tape having first and second opposite ends spaced in a first direction, opposite first and second primary outer surfaces extending between said ends, a manually engageable portion adjacent said first end, and an attachment portion between said manually engageable portion and said second end comprising a layer of aggressive pressure sensitive adhesive providing an adhesively aggressive portion of each of said outer surfaces, each adhesively aggressive portion having a primary end adjacent the first end of said tape, a secondary end adjacent the second end of said tape and being firmly adhered to a different one of said structures between said primary and secondary ends, said attachment portion being stretchable so that said attachment portion between and adhered to said structures can be progressively stretched along its length by the manual application of force to said manually engageable portion to cause separation of said adhesively aggressive surface portions from said structures progressively from said primary ends towards said secondary ends, said secondary ends of said adhesively aggressive surface portions being spaced from each other in said first direction to cause complete separation of one of said adhesively aggressive surface portions from one of the structures substantially prior to separation of the other of said adhesively aggressive surface portions from the other of the structures.

10. An assembly according to claim 9 wherein said tape comprises a single layer of pressure sensitive adhesive providing each of said adhesively aggressive portions of said outer surfaces and includes a masking layer of material having no adhesive properties or adhesive properties that are significantly reduced from said layer of pressure sensitive adhesive adjacent said second end of the tape and extending over a part of the layer of pressure sensitive adhesive defining one of said adhesively aggressive portions of said outer surfaces to space the secondary ends of said adhesively aggressive portions of said outer surfaces from each other.

11. An assembly according to claim 10 wherein said material in said masking layer is selected from the group consisting of release liner material, repositionable pressure sensitive adhesive, polymeric film, paper, powder, ink, and low adhesion backsize material.

12. An assembly according to claim 9 wherein said tape includes a stretchable polymeric backing layer having opposite major surfaces and a layer of aggressive pressure sensitive adhesive along each of said opposite major surfaces defining one of said adhesively aggressive portions of said outer surfaces.

13. A tape according to claim 12 wherein said stretchable polymeric backing layer is of a material selected from the group consisting of polymeric film, polymeric foam, polymeric film laminated to polymeric foam and two polymeric films laminated to opposite sides of a layer of polymeric foam.

14. An assembly according to claim 12 wherein the ends adjacent said second end of the layers of aggressive pressure sensitive adhesive on both major surfaces of the backing layer extend to the same location with respect to the second end of the tape, and the tape includes a masking layer of material having no adhesive properties or adhesive properties that are significantly reduced from said layer of pressure sensitive adhesive adjacent said second end of the tape and extending over a part of one of the layers of aggressive adhesive to space the secondary ends of said adhesively aggressive portions of said outer surfaces from each other.

15. An assembly according to claim 14 wherein said material in said masking layer is selected from the group consisting of release liner material, repositionable pressure sensitive adhesive, polymeric film, paper, powder, ink, and low adhesion backsize material.

16. An assembly according to claim 12 wherein ends adjacent said second end of the layers of aggressive adhesive on both major surfaces of the backing layer define the secondary ends of said adhesively aggressive portions of said outer surfaces and extend to different locations with respect to the second end of the tape to space the secondary ends of said adhesively aggressive portions of said outer surfaces from each other.

17. An assembly according to claim 9 wherein said first structure is a hook and said second structure is a wall.

18. An assembly according to claim 17 wherein said adhesively aggressive surface portions are spaced from each other in said first direction to cause complete separation of one of said adhesively aggressive surface portions from said hook prior to separation of the other of said adhesively aggressive surface portions from said wall.

19. An assembly comprising a tape attaching first and second structures to each other, said first structure having a rear surface including a rear surface portion adapted to be adhered to extending to an edge, said tape having first and second opposite ends spaced in a first direction, opposite first and second primary outer surfaces extending between said ends, a manually engageable tab portion adjacent said first end, and an attachment portion between said manually engageable portion and said second end comprising a layer of aggressive pressure sensitive adhesive providing an adhesively aggressive portion of each of said outer surfaces, each adhesively aggressive portion having a primary end adjacent the first end of said tape, a secondary end adjacent the second end of said tape and being firmly adhered to a different one of said structures with the adhesively aggressive portion adhered to said first structure being adhered to said rear surface with said edge spaced in said first direction from the primary end of the adhesively aggressive portion adhered to said second structure and with the adhesively aggressive portion adhered to said second structure at said secondary end, said attachment portion being stretchable so that said attachment portion between and adhered to said structures can be progressively stretched along its length by the manual application of force to said manually engageable tab portion to cause separation of said adhesively aggressive surface portions from said structures progressively from said primary ends towards said secondary ends, with the spacing between the edge and the secondary end of said adhesively aggressive surface portion adhered to said second structure causing separation of the adhesively aggressive surface portion from the first structure substantially prior to separation of the other of said adhesively aggressive surface portions from the second structure.

20. An assembly according to claim 19 wherein said rear surface ends at said edge.

21. An assembly according to claim 19 wherein said rear surface includes a release portion extending past said edge and including means along said release portion for restricting adhesion of said adhesively aggressive portion to said release portion.

22. An assembly according to claim 21 wherein said means along said release portion for restricting adhesion of said adhesively aggressive portion to said release portion is selected from the group consisting of a coating of release material, and rough surface texture.

\* \* \* \* \*